US012736024B2

(12) United States Patent
Zheng et al.

(10) Patent No.: US 12,736,024 B2
(45) Date of Patent: Sep. 15, 2026

(54) IGNITION SYSTEM AND CONTROL METHOD

(71) Applicants: CLEAN COMBUSTION ENGINE TECHNOLOGY INC., Ontario (CA); WEICHAI TORCH TECHNOLOGY CO., LTD., Hunan (CN)

(72) Inventors: Ming Zheng, Ontario (CA); Guangyun Chen, Hunan (CN); Xiao Yu, Ontario (CA); Ying Peng, Hunan (CN); Jin Qian, Hunan (CN); Linyan Wang, Ontario (CA)

(73) Assignees: CLEAN COMBUSTION ENGINE TECHNOLOGY INC., Ontario (CA); WEICHAI TORCH TECHNOLOGY CO., LTD., Hunan (CN)

( * ) Notice: Subject to any disclaimer, the term of this patent is extended or adjusted under 35 U.S.C. 154(b) by 64 days.

(21) Appl. No.: 18/902,794

(22) Filed: Sep. 30, 2024

(65) Prior Publication Data

US 2026/0049589 A1 Feb. 19, 2026

(30) Foreign Application Priority Data

Aug. 19, 2024 (CN) ......................... 202411136953.0

(51) Int. Cl.
*F02P 9/00* (2006.01)

(52) U.S. Cl.
CPC .................................... *F02P 9/002* (2013.01)

(58) Field of Classification Search
CPC ....................................................... F02P 9/002
See application file for complete search history.

(56) References Cited

U.S. PATENT DOCUMENTS 5,163,411 A * 11/1992 Koiwa .................. F02P 3/0838 361/256
2010/0005870 A1* 1/2010 Bachmaier .............. F02P 17/12 73/114.62
2012/0160222 A1 6/2012 Grady

OTHER PUBLICATIONS

Matthew Krolak, myelectricengine.com, Ignition Coil Measurements and Characterizations, http://myelectricengine.com/everythingelse/ignition/measurements/measurements.html, 2007 (Year: 2007).*

* cited by examiner

*Primary Examiner* — Kevin A Lathers
(74) *Attorney, Agent, or Firm* — JCIPRNET

(57) ABSTRACT

An ignition system is provided. The ignition system includes at least one ignition module, which has an input end to receive control signal from the ECU, and an output end to supply ignition energy to the spark gap. The ignition module provides on-demand ignition energy based on an engine operation conditions with adaptively controlled discharge current amplitude and duration using prompt feedback signals measurement of the plasma impedance.

20 Claims, 14 Drawing Sheets

IGNITION SYSTEM AND CONTROL METHOD

CROSS-REFERENCE TO RELATED APPLICATION

This application claims the priority benefit of China application serial no. 202411136953.0 filed on Aug. 19, 2024. The entirety of the above-mentioned patent application is hereby incorporated by reference herein and made a part of this specification.

TECHNICAL FIELD

The present invention is in the field of an ignition system suitable for automotive applications. On-demand discharge energy profiling is achieved via active plasma impedance modulation and prompt combustion diagnostics.

DESCRIPTION OF RELATED ART

Intake dilution and intensified air motion are the main technical path to further improve the efficiency of spark ignition engines. Under such conditions, robust ignition process of the air-fuel mixture becomes important to maintain proper operation of an engine. Prolonged discharge duration and enhanced discharge current amplitude have been recognized to be effective to ignite diluted mixture reliably, enhancing engine performances.

However, high discharge current and long discharge duration increase system power consumption, and more importantly, reduce the durability of spark plugs, because of the accelerated erosion process caused by the high discharge current. On-demand discharge energy profiling strategy is preferable, to deliver sufficient discharge current amplitude and duration when high ignition performance is needed during engine transients, and actively optimize the ignition energy supply based on engine operation condition.

Moreover, despite the fact that long-stretching plasma channels are preferred to generate stronger flame kernels, plasma stretching caused by the in-cylinder flow across the spark gap can induce restrike and plasma blow-out events, leading to discrete flame kernels which are weak and prone to quenching. The impedance of the plasma needs to be monitored and properly controlled to avoid restrike and blow-out events.

The impedance of the plasma channel is mainly affected by plasma length, background density, background temperature, and discharge current amplitude. The change in discharge current amplitude governs the ionization intensity and is one of the most effective ways to control the impedance of the plasma channel. Prompt (microsecond level), adaptive and precise control over discharge current is necessary to eliminate plasma restrike and blow-out events throughout the discharge process, which ideally lasts for 2~3 ms for each spark event.

Various ignition systems have been invented to increase the discharge duration of a spark event. Among the leading contenders, dual coil offset ignition systems draw most attention, such as "US20120160222A1". Various dual-coil related techniques, setups, and strategies have been patented, focusing on optimizing the operation of the dual-coil system, such as discharge current amplitude control and plasma blow-out detection.

However, the features disclosed in those patents are unable to achieve on-demand ignition profiling based on engine need, due to the lack of both hardware capability and control strategies. Blow-out detection can trigger a re-ignition event in some patents to save the combustion process, but the late combustion phasing still results in significant unburn HC emissions because of the delayed ignition timing. The discharge current amplitudes disclosed by recent patents are also within a relatively narrow range, which is ineffective to control the plasma impedance to eliminate restrike and promote plasma stretching.

SUMMARY

The present disclosure relates to systems and methods of controlling, diagnosing, and operating an ignition system for an engine. One embodiment relates to at least one ignition module, which has an input end to receive command from the electronic control unit (ECU), and an output end electrically coupled to the spark plug to deliver spark energy to the spark gap. The ignition module supplies spark energy adaptively within one engine cycle, based on engine operation conditions.

Furthermore, the ignition module consists of a control unit, at least one ignition energy management unit and at least one dedicated ignition coil, and the output end of the ignition energy management unit and the dedicated ignition coil are connected in parallel, then connected to the spark plug; the control unit receive feedback signal including plasma impedance signal and combustion diagnostic signal to adaptively deliver on-demand ignition energy according to engine need via ignition energy management unit.

Furthermore, the ignition module consists of one ignition energy management unit and multiple dedicated ignition coil, and the number of the dedicated ignition coil equals the number of spark plugs needed for specific applications; the output end of each dedicated ignition coil is electrically coupled to each spark plug separately, while the output end of the ignition energy management unit is split and then electrically coupled to all the spark plugs.

Furthermore, the dedicated ignition coil consists of a primary coil and a secondary coil; the primary coil is couple to an electronic switch to receive ignition command to charge the coil, and the secondary coil has an output end couple to the spark plug. The output ends of the ignition energy management unit and the dedicated ignition coil are electrically coupled to a single directional circuit before merged and coupled to the spark plug. The dedicated ignition coil is structured to measure the discharge voltage to provide feedback signal to the control unit.

Another embodiment relates to the ignition energy management unit, which consists of multiple ignition coil connected in parallel; the output of each ignition coil is electrically coupled to a high voltage diode, and then couple with each other to form the output end, which is then split to couple with spark plugs. The ignition coils operate under the same frequency in an alternating manner with specific time offset. If the number of the coil is n, the discharge duty cycle of each coil is within the range between 1/n to (n−1)/n, where n equals or greater than 3. The turning ratio of the ignition coil is within the range of 25:1 to 60:1.

Still another embodiment relates to the ignition energy management unit, which consist of a DC-DC converter, an energy storage capacitor, and high voltage electronic switch. The input of DC-DC converter is connected to a power source, while the output is connected to the energy storage capacitor; one end of the high voltage switch is electrically coupled with the output of the energy storage capacitor, the other end merged with the output end of the dedicated ignition coil, then coupled to the spark plug.

Yet another embodiment relates to a method to control the ignition system. The method includes three ignition steps: S1, spark initiation, utilizing a dedicated ignition coil to build up high voltage to establish the plasma channel; S2, continuous discharge process, to supply constant discharge current after the establishment of the plasma channel; S3, plasma diagnostic during the continuous discharge process, which dynamically adjust the discharge current amplitude based on the feedback signal from the plasma impedance to avoid blow-off and restrike of the plasma channel due to the in-cylinder flow.

Furthermore, in step S3, the collect discharge voltage is collected to calculate the plasma impedance as feedback signal for enhancing the discharge current amplitude when discharge voltage is above certain threshold. The speed of the in-cylinder flow is determined based on the changing rate of plasma impedance; if in-cylinder flow speed is low, use a first control strategy, if in-cylinder flow speed is high, use a second control strategy.

A further embodiment relates to a first control strategy, wherein the discharge event is controlled to have a first discharge power and have a first discharge duration; and a second control strategy, wherein the restrike and blow-off tendency is predicted, and the discharge current amplitude is promptly increased if the restrike/blow-off tendency is high.

Furthermore, the second control strategy is structured to predict the restrike/blow-off tendency via the changing rate and amplitude of the discharge voltage. The in-cylinder flow speed can also be estimated based on the changing rate of the discharge voltage.

Furthermore, the second control strategy is structured to control both the discharge current amplitude and discharge duration based on combustion diagnostic and plasma diagnostic:

If restrike/blow-off tendency is high but combustion is normal, then only increase the discharge current amplitude. If restrike/blow-off tendency is high and partial burn is detected, then increase the discharge current amplitude and prolong the discharge duration. If restrike/blow-off tendency is low but partial burn is detected, then only prolong the discharge duration.

Still a further embodiment relates to a combustion diagnostic method, wherein voltage pulses are sent via the ignition energy management unit after the spark event to try to initiate plasma channel using voltage lower than breakdown voltage threshold; if the discharge voltage/current is detected, the combustion is considered normal, if the discharge voltage/current is not detected, the combustion is considered partial burn.

Furthermore, the plasma impedance after the spark event is also used to perform combustion diagnostic. If the changing slope of the discharge voltage is lower than the reference slope under air condition, the combustion is considered normal, if the changing slope is the same or higher than the reference slope under air condition, the combustion is considered partial burn or misfire.

DESCRIPTION OF THE EMBODIMENTS

In this disclosure, an ignition module is proposed, to use ECU ignition signals as trigger to supply on-demand spark energy to each cylinder to improve ignition control and combustion stability. The invention has a wide spectrum of applications, ranging from high-speed automotive engines to low-speed stationary and marine engines, as well as gas turbine engines. The self-adaptive smart logic can adjust the spark energy profile based on various application scenarios. The basic structure of the system is shown in FIG. 1.

Figure 1:
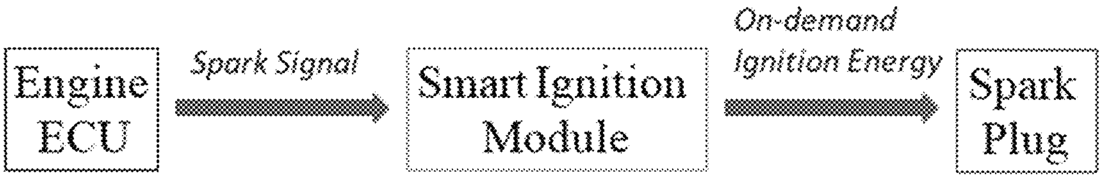
FIG. 1 is a graph depicting the structure of the system.
Figure 2:
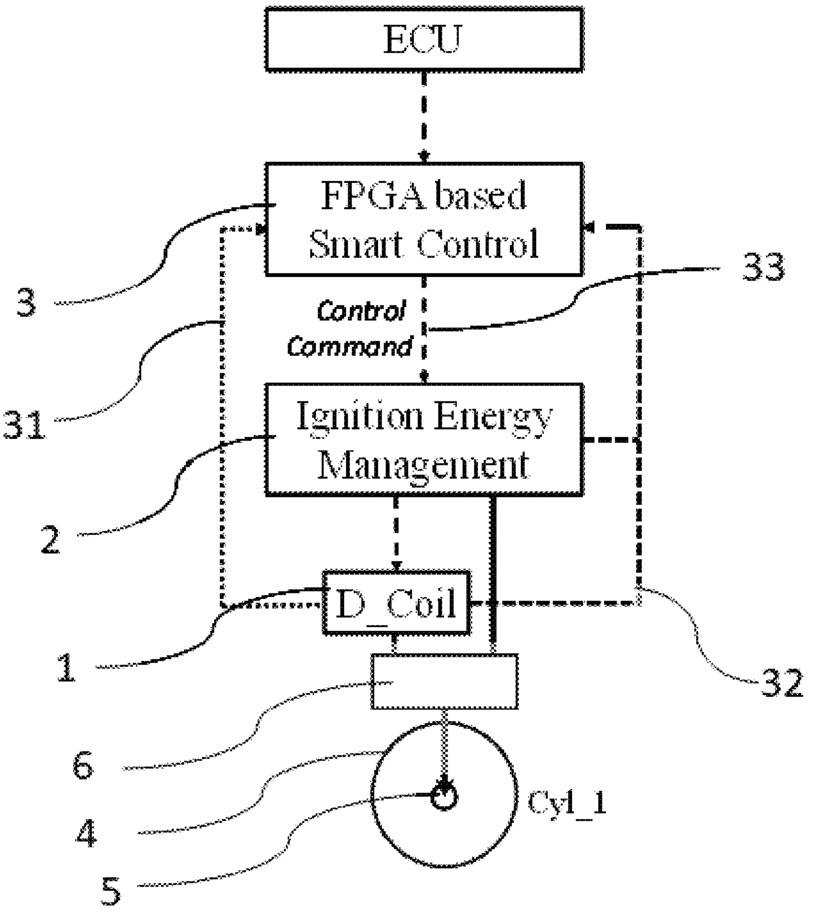
FIG. 2 is a graph depicting the operation principle of an exemplar embodiment.

Based on FIG. 1, one of the possible structures of the ignition system is shown in detail in FIG. 2, which comprises at least a control unit 3, an ignition energy management unit 2, and a dedicated ignition coil 1. The output of the dedicated ignition coil 1 and the ignition energy management unit 2 are connected to a single directional circuit 6 and they electrically connected to the spark plug 5. The control unit 3 is structured to receive plasma diagnostic signal 31 from dedicated ignition coil 1, and the combustion diagnostic signal 32 from both dedicated ignition coil 1 and ignition energy management unit 2, to provide ignition command 33 to the ignition energy management unit 2 to supply and adaptively adjust ignition energy based on the engine need within an engine cycle.

The dedicated ignition coil 1 is structured to build up breakdown voltage and establish the plasma channel, to let the ignition energy management unit 2 deliver spark energy into the cylinder 4 via spark plug 5. Moreover, dedicated ignition coil 1 is also structured to measure the plasma impedance and detect flame propagation in the combustion cylinder 4.

The ignition energy management unit 2 is structured to deliver continuous ignition energy to the spark gap, with flexible modulation over discharge duration and discharge current amplitude much longer and higher than traditional ignition coils, respectively. High peak discharge amplitude and prompt discharge current amplitude modulation are necessary to effectively control the plasma impedance to avoid restrike and blow-out events, as well as enhancing ignition capability of the spark event. The ignition energy management unit 2 can adjust the discharge current amplitude within microseconds level, based on the control command 33 sent from the control unit 3, which can realize transient discharge current amplitude adjustment within an engine cycle. Control unit 3 can utilize the plasma and combustion diagnostic signal to decide the ignition energy and duration desired, therefore dynamically adjust the discharge current amplitude and discharge duration via ignition energy management unit 2 based on engine need.

Figure 3:
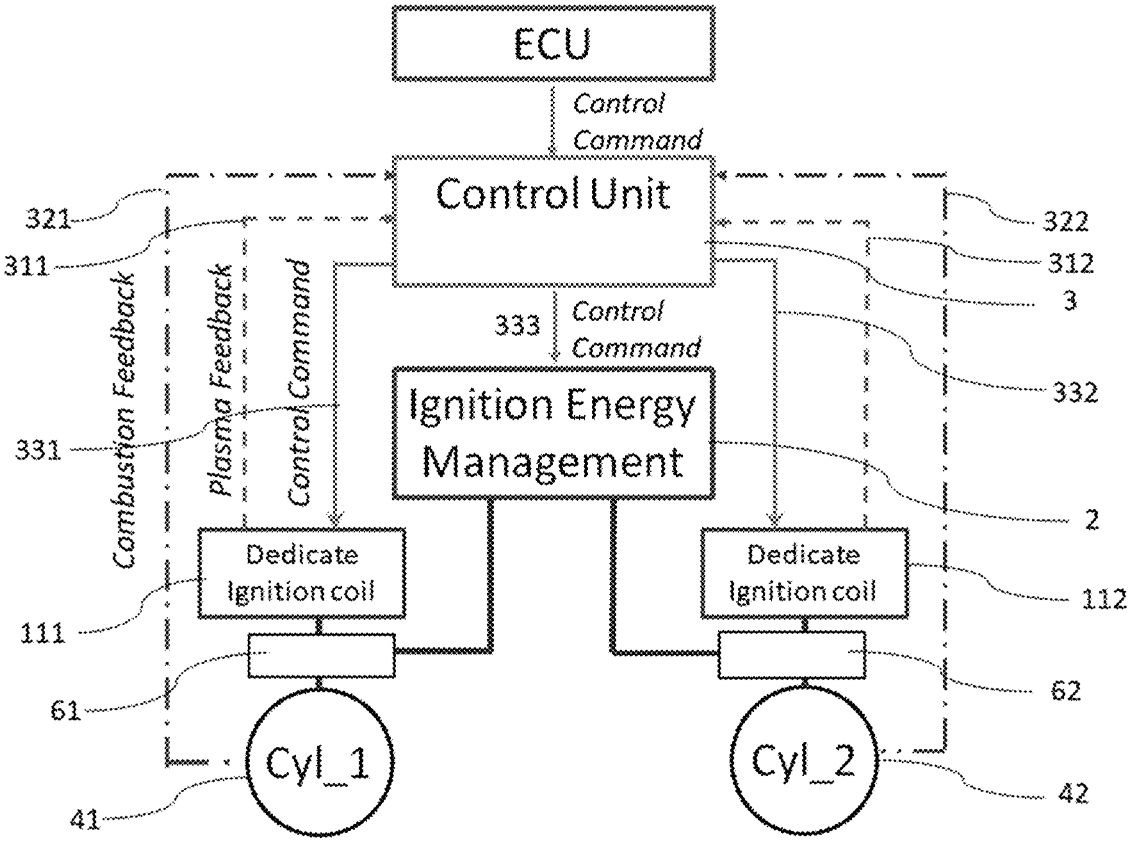
FIG. 3 is a graph depicting the operation principle of another exemplar embodiment.

FIG. 3 shows one possible embodiment of the ignition system driving two engine cylinders, including a control unit 3, an ignition energy management unit 2, and two single directional circuits 61 and 62, two dedicated ignition coils 111 and 112. The output end of dedicated ignition coils 111 and 112 is electrically coupled to each single directional circuit 61 and 62, respectively, while the output end of the ignition energy management unit 2 is split and then electrically coupled to the single directional circuits 61 and 62. For cylinder 41, the output of dedicated ignition coil 111 and ignition energy management unit 2 is merged downstream the single directional circuit 61, and then electrically coupled with the spark plug on cylinder 41. The spark energy circuit for cylinder 42 has the same structure as cylinder 41. Such arrangements can avoid the interference between the discharge events among the cylinder 41 and 42 by the dedicated ignition coils 111 and 112, as well as the interference between the dedicated ignition coils 111 and 112 and the ignition energy management unit 2. Plasma feedback signals 311 and 312, as well as combustion feedback signals 321 and 322 are collected by control unit 3 to send control command 331 and 332 to actively control the discharge strategy in cylinder 41 and 42, respectively.

Figure 4:
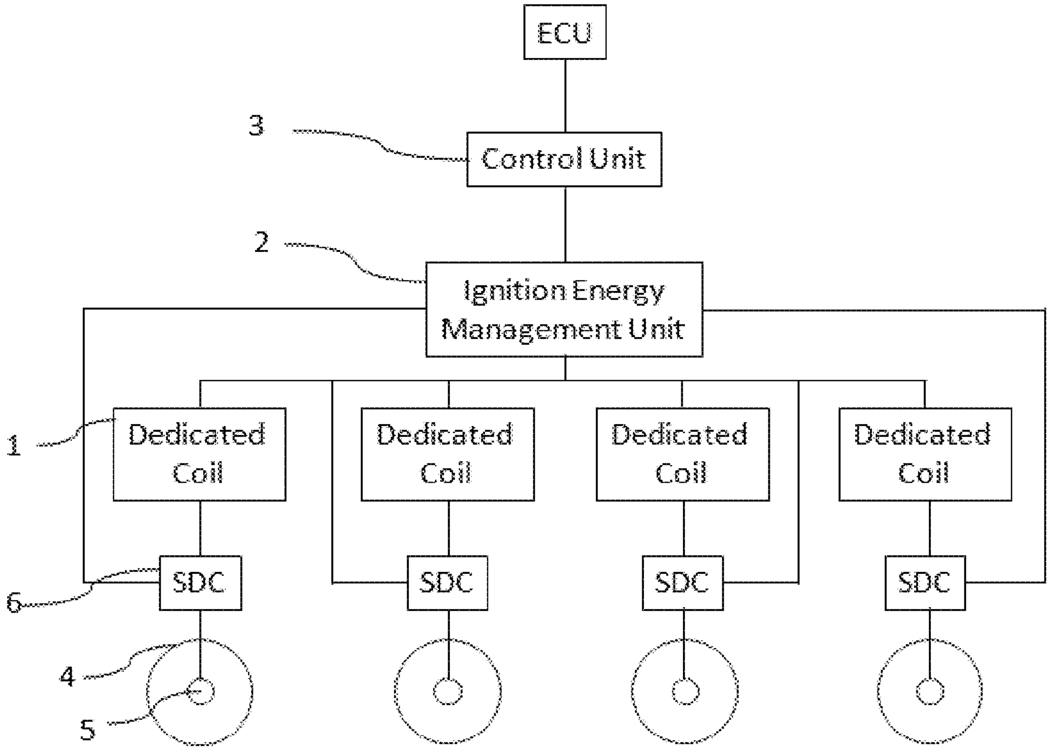
FIG. 4 is a graph depicting the operation principle of the third exemplar embodiment.

One ignition energy management unit 2 can be shared by multiple combustion cylinders 4 to reduce the complexity and cost of the ignition system. The maximum output voltage of ignition energy management unit 2 is from 1 to 4 kV, which is lower than the breakdown voltage threshold, and can only supply energy to the spark plug 5 when the plasma channel is already established by the dedicated ignition coil 1. This characteristic automatically avoids the discharge from ignition energy management unit 2 to non-combustion cylinders. The discharge timing of ignition energy management unit 2 must be within the discharge duration of the dedicated ignition coil 1, and release the energy to the spark plug 5 at the existence of the plasma channel. FIG. 4 depicts another embodiment with a single ignition energy management unit 2 shared by four cylinders 4.

Figure 5:
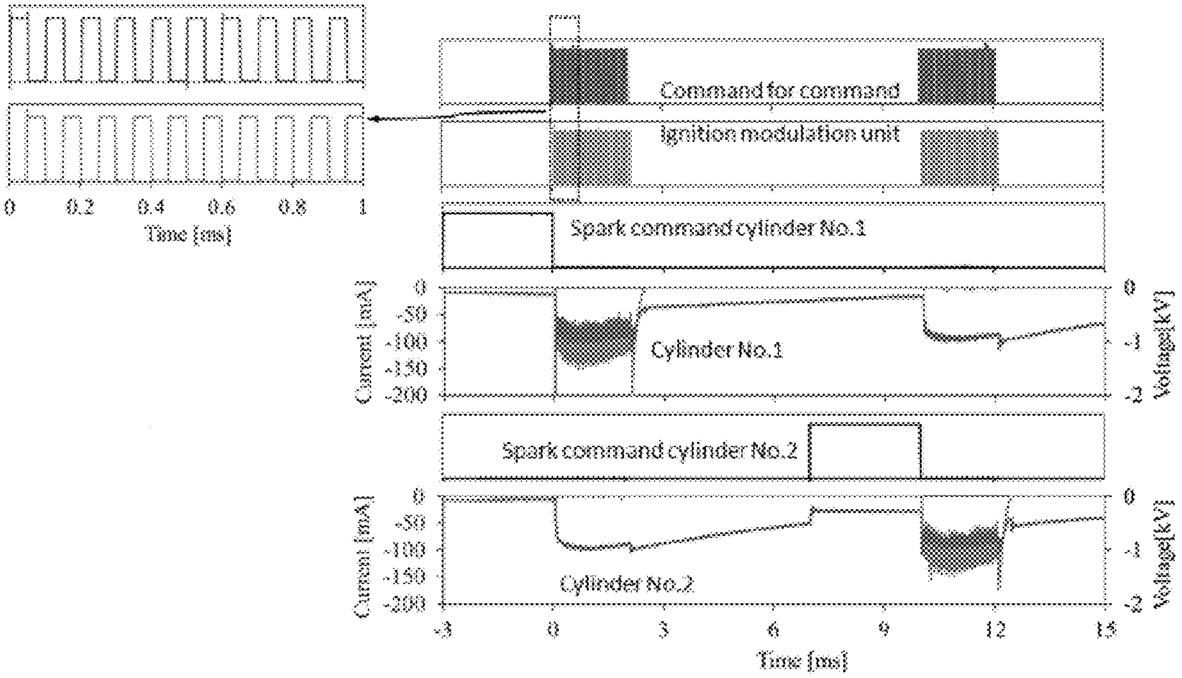
FIG. 5 is a graph depicting the electric waveform of the system when driving two cylinders.

FIG. 5 shows the discharge waveforms of using a single ignition energy management unit 2 to discharge to two spark gaps. It is obvious from the secondary voltage measurement that the discharge voltage can be detected across both spark gaps, but only one cylinder has the actual discharge event from the discharge current measurement. Buy precisely control the discharge timing of the ignition energy management unit 2, the energy can be delivered to the desired cylinder without the help from a high voltage electronic switch, such as IGBT or MOSFET, which simplify the circuit significantly.

Figure 6:
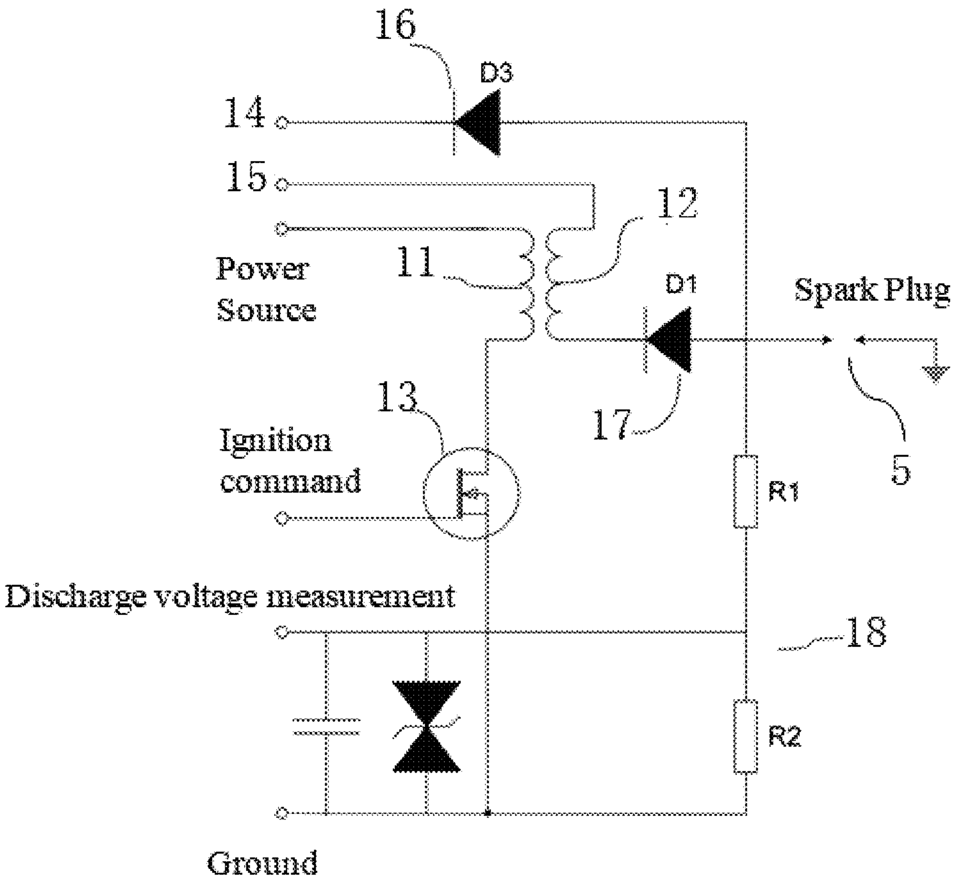
FIG. 6 is a graph depicting the electric wiring diagram of the dedicated ignition coil of an exemplar embodiment.

An exemplary embodiment of the structure of the dedicated ignition coil 1 is listed in FIG. 6. The dedicated ignition coil 1 comprises a primary coil 11 and a secondary coil 12. One end of the primary coil is connected to the power source, and the other end is electrically coupled with a transistor 13 to control the charging of the primary coil 11. One end of the secondary coil 12 is connected to the spark plug which delivers voltage high enough to establish the breakdown channel. The other end of the secondary winding 15 is used for combustion diagnostics. The dedicated ignition coil 1 is also structured to transfer energy from the ignition energy management unit 2 to spark plug 5 via a high voltage port 14.

A first high voltage diode 17 is connected in series between the output end of the secondary coil and the spark gap to prevent mis-discharge during the charging process. A high voltage line is arranged in parallel with the secondary circuit of the dedicated ignition coil. One end of the high voltage line is electrically coupled with port 14, and the other end of the high voltage line merges with output of the secondary coil 12, downstream of diode 17. A high voltage diode 16 is installed along the high voltage line between the high voltage connection port and the merge point. Diode 16 is used to isolate the high voltage generated by the dedicated ignition coil 1, preventing the potential interference among various engine cylinders.

A voltage measurement circuit 18 is structured to monitor the discharge voltage as plasma diagnostic signal and send to control unit 3. A first resistor R1 and a second resistor R2 are connected in series. The other end of R1 is connected to the output end the secondary winding, between diode 17 and the spark gap. The other end of R2 is connected to the ground. The plasma voltage detection point is between R1 and R2. The ratio between actual plasma voltage and measured voltage is decided by the resistance of R1 and R2. For example, if the resistance of R1 is 1000 times higher than R2, the measured plasma voltage is 1000 less than the actual plasma resistance. A second diode (Zener diode) might be needed to filter out the high voltage measurement voltage during breakdown. The measurement focuses on the discharge voltage during glow phase, in order to detect or predict potential restrike or blow-out event.

The dedicated ignition coil 1 is designed with high turning ratio (70:1~120:1) to generate breakdown voltage high enough (40~60 kV) to trigger breakdown under engine conditions. For the present invention, the main ignition energy is supplied by the ignition energy management unit 2. Therefore, the dedicated ignition coil 1 is structured to realize fast charging and discharging process with much lower primary and secondary inductances. The charging duration of the dedicated ignition coil 1 can be as low as 20~100 μs. Such short charging duration is beneficial to re-establish the plasma channel within 1° CA, in case of plasma blow-out under intensified in-cylinder flow speeds. The reduced secondary inductance can also decrease resistive losses significantly, reducing the energy consumption of the dedicated ignition coils. Capacitive discharge ignition (CDI) systems can also be used to initiate the discharge process with high response.

Figure 7:
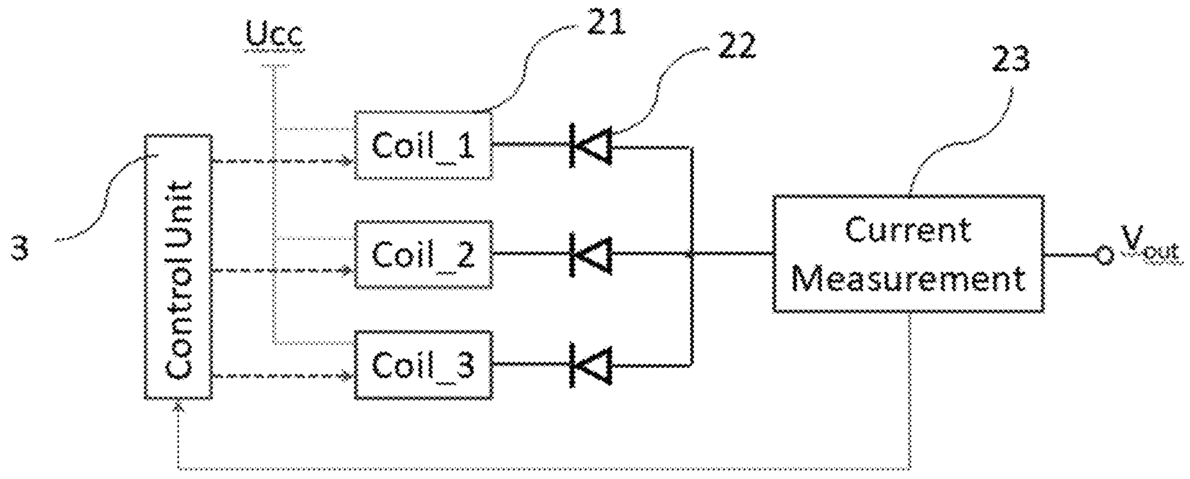
FIG. 7 is a graph depicting the operation principle of the ignition energy management unit of an exemplar embodiment.

FIG. 7 depicts one exemplary embodiment of the ignition energy management unit 2. The ignition energy management unit 2 consists of multiple parallelly connected ignition coils 21. The output of each ignition coil is electrically coupled to a high voltage diode 22 and then merging together. The merging point can be further split into multiple outputs to connect with the spark plugs on the multiple combustion cylinders. A current measurement unit 23 is connected in-series with the high voltage output line, downstream of the merging point. The measured discharge current is reported promptly to smart control module for flame diagnostic purpose, which decides the on-demand discharge duration.

Figure 8:
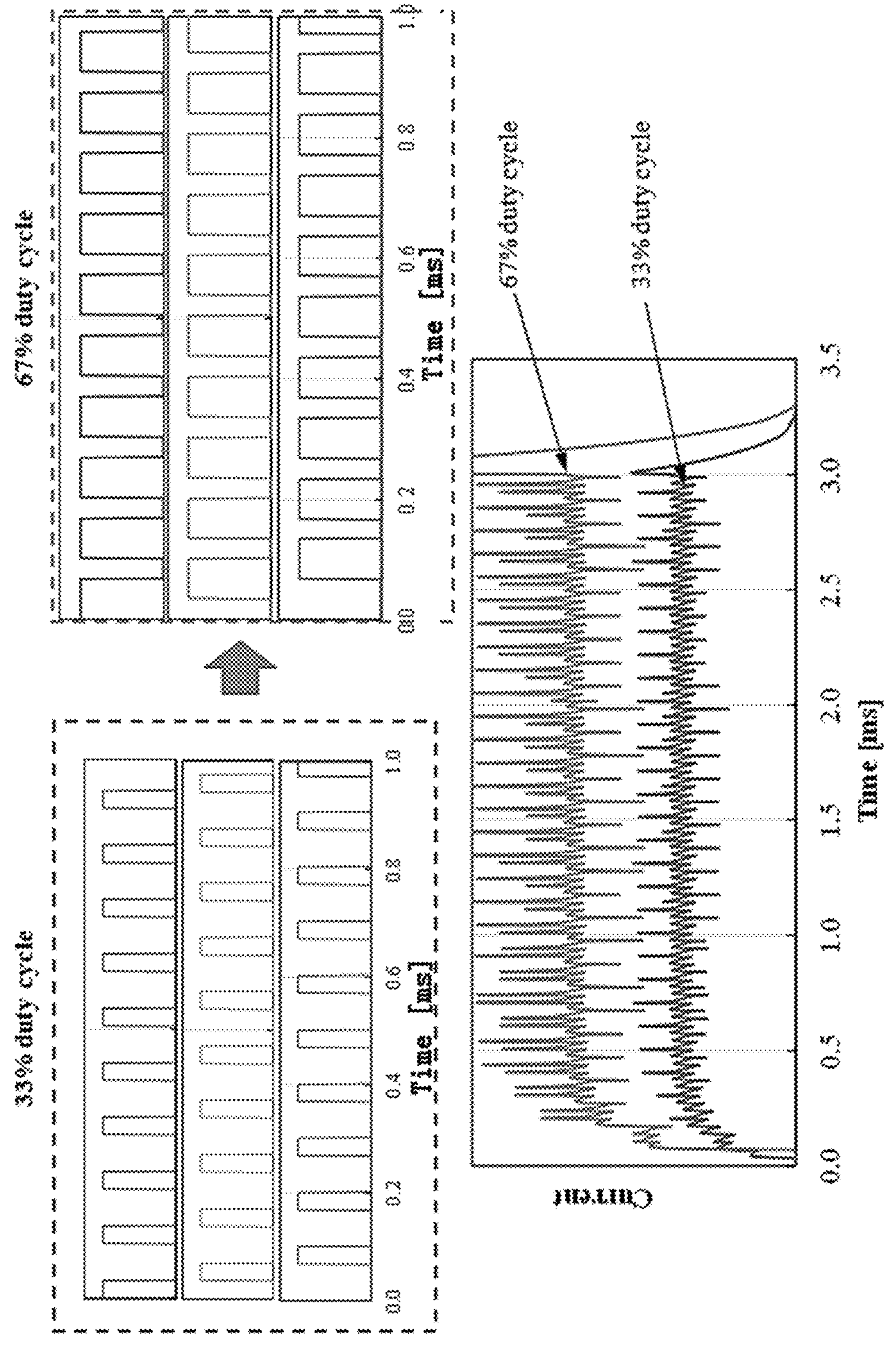
FIG. 8 is a graph depicting the discharge waveform of an ignition energy management unit.

FIG. 8 depicts an exemplary control method and the resulting discharge current waveforms when using three ignition coils. It is observed that both 33% and 67% duty cycle can generate steady discharge current, but with different amplitudes because of the difference in charging duration of the ignition coils. The discharge current of 67% duty cycle has much higher than the 33% duty cycle case, because of the longer charging duration. More importantly, the operation duty cycle of the ignition coils 21 in the ignition energy management unit 2 can be shifted promptly, which can change the discharge current amplitude within microsecond level for transient on-demand discharge current modulation within an engine cycle. The ignition coils 21 operate under the same frequency in an alternating manner with specific time offset. If the number of the coil is n, the discharge duty cycle of each coil is within the range between 1/n to (n−1)/n, where n equals or greater than 3.

The coil for ignition energy management unit 2 is designed to have peak discharge voltage of 1~4 kV), much lower than traditional ignition coils (30~45 kV). The turning ratio between the secondary and primary winding ranges 25:1~60:1, compared with 80~120:1 of traditional ignition coils. Such change can significantly increase the discharge current amplitude, enhancing the ignition performance of the spark event. The much lower secondary inductances also reduce the secondary resistance, further enhancing the efficiency of the coil system.

Figure 9:
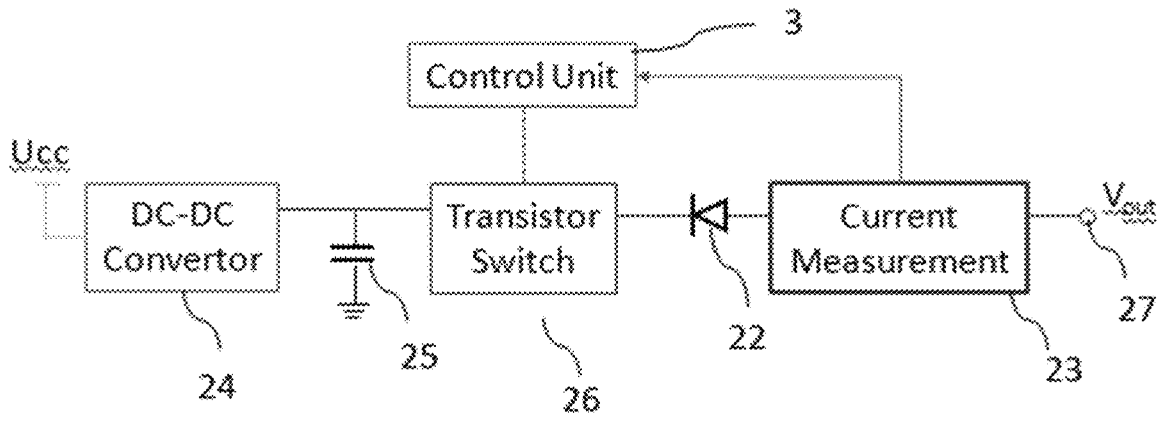
FIG. 9 is a graph depicting the operation principle of the ignition energy management unit of another exemplar embodiment.

As depicted in FIG. 9, another embodiment of the ignition energy management unit 2 is consist of a DC-DC converter 24, an energy storage capacitor 25, and high voltage electronic switch 26. The input of DC-DC converter 24 is connected to a power source, while the output is connected to the energy storage capacitor 25; one end of the high voltage switch 26 is electrically coupled with the output of the energy storage capacitor 25, the other end merged with the output end of the secondary coil 12 of the dedicated ignition coil 1, then coupled to the spark plug. The low voltage from battery is boosted up by the DC-DC converter 22 and stored in the energy storage capacitor 25, and is released to the spark plug by the control of the high voltage switch 26. The discharge current amplitude can be tuned by controlling the capacitor voltage, while the discharge duration is directly controlled by the switch 26. A high voltage diode 22 is placed downstream the transistor switch 26 to prevent high voltage interference from the output of dedicated ignition coil connected to the output 27 of this ignition energy management unit 2.

The operating frequency of the step-up transformer needs to be sufficiently high (5~20 kHz) to maintain the capacitor voltage during the discharge process. Considering a discharge voltage of 2 kV and discharge current of 200 mA~1000 mA from the capacitor output end, the transient discharge power of the capacitor can be as high as 400~2000 W. Assuming discharged duration of 3 ms for each spark event, averaged power demand from the ignition system is 30~150 W per cylinder. Dedicated transistor switches, such as power MOSFETs or IGBTs will be needed to control the discharge process, including discharge timing and discharge duration. The stored voltage should be lower than the breakdown voltage, but higher than the typical discharge voltage during the glow phase to boost up the discharge current amplitude for prolonged plasma stretching length. The discharge current amplitude is governed by the voltage level in the capacitor and the impedance along the RC discharge circuit. To generate sufficient discharge current, the resistance of the spark plug needs to be decreased from the present 4.5 kΩ down to 1~2 kΩ to generate 200 mA~1000 mA discharge current for various engine operation conditions.

Based on the structure of the ignition systems, a control method is demonstrated consisting:

S1, spark initiation, utilizing a dedicated ignition coil to build up high voltage to establish the plasma channel;

S2, continuous discharge process, to supply constant discharge current after the establishment of the plasma channel;

S3, plasma diagnostic during the continuous discharge process, which dynamically adjusts the discharge current amplitude based on the feedback signal from the plasma impedance to avoid blow-off and restrike of the plasma channel due to the in-cylinder flow.

The dedicated ignition coil 1 is structured to establish the plasma channel (S1) to let ignition energy management unit 2 to release energy to the spark plug; the dedicated ignition coil 1 is also structured to measure discharge voltage and ion current signal to provide plasma impedance diagnostics and combustion diagnostics, respectively. The ignition energy management unit 2 supplies spark energy to the spark plug during S2, with discharge current amplitude and duration much higher than the dedicated ignition coil 1 to enhance the ignition performance significantly. Both combustion and plasma diagnostic signals are collected by control unit 3, which actively adjusts the discharge current amplitude and discharge duration within sub-microsecond level. This fast response is sufficient to realize in-cycle ignition strategy adjustment based on ignition need, maintaining stable combustion process under lean/diluted and transient condition to further improve fuel efficiency and reduce exhaust emissions.

Therefore, the ignition process is categorized as initial ignition stage S1 and continuous ignition stage S2, and perform plasma and combustion diagnostics during S3 to dynamically adjust the ignition parameters to enhance ignition performance. During S3, the change in plasma impedance is obtained by the discharge voltage measurement, and when discharge voltage is higher than certain threshold, the ignition energy management unit 2 starts to boost the discharge current to control the plasma impedance.

Figure 10:
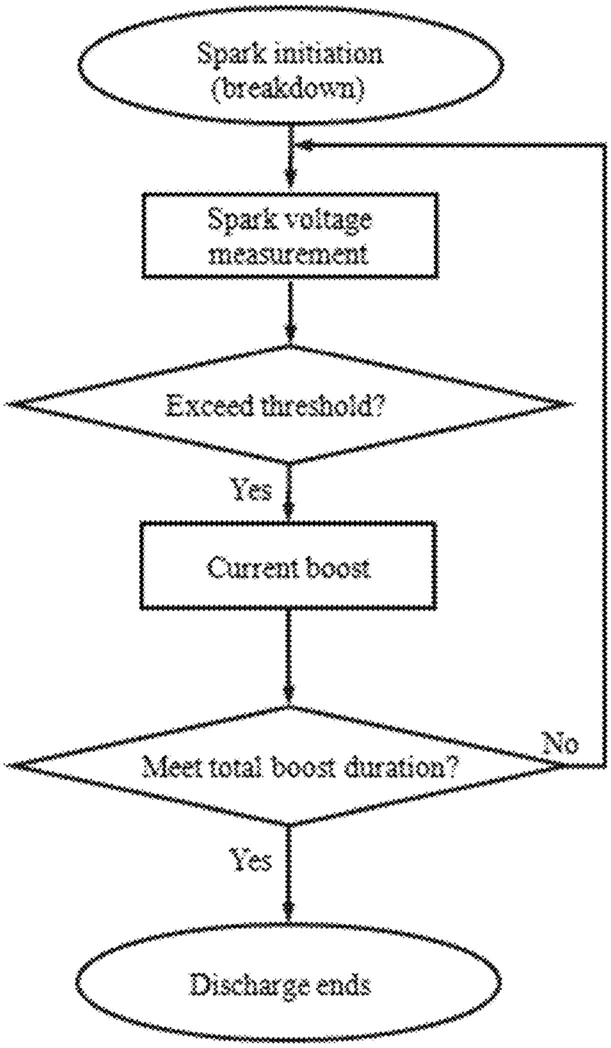
FIG. 10 is a graph depicting control method 1 of the ignition energy management unit.
Figure 11:
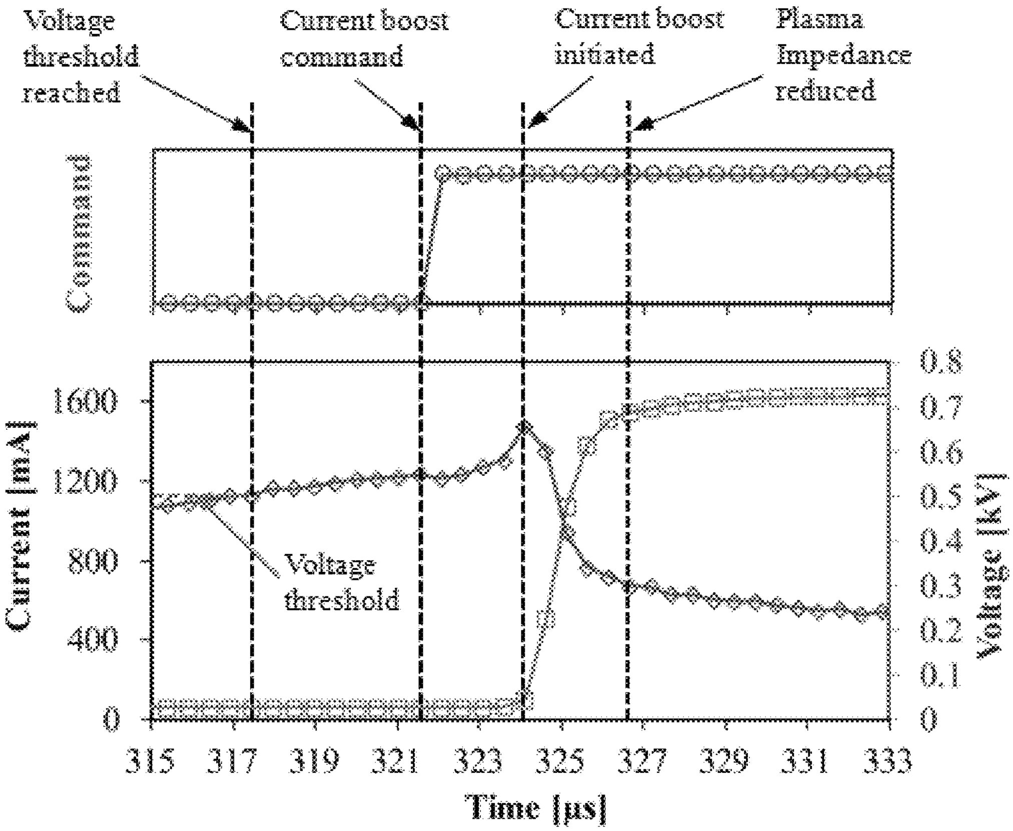
FIG. 11 is a graph depicting the fast plasma impedance control using control method 1.
Figure 12:
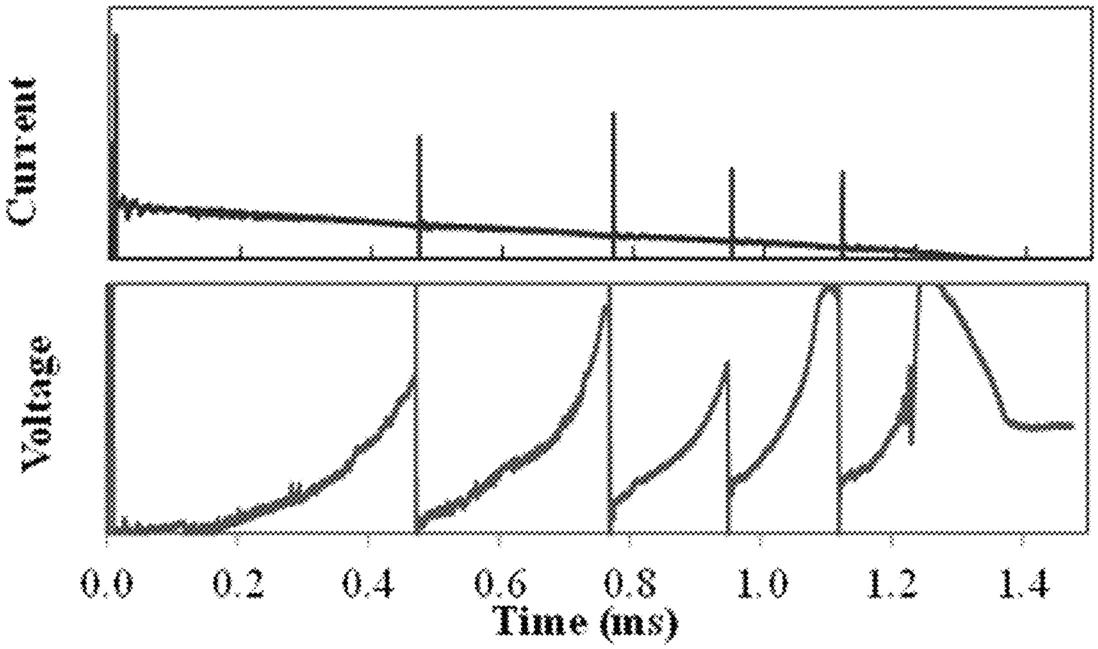
FIG. 12 is a graph depicting discharge waveform of a spark event without ignition current control.

FIG. 10 demonstrates one of the possible methods to control the plasma impedance based on discharge voltage measurements. A specific discharge voltage level is set up as the threshold to trigger the discharge current boost event, as shown in FIG. 11. Before the restrike event happens, a sharp voltage increase is observed, as demonstrated in FIG. 12, caused by plasma stretching. When the voltage needed to sustain a plasma channel is higher than the voltage required for a breakdown event across the spark gap, a restrike event would happen. As demonstrated in FIG. 11, the discharge voltage keeps increasing when plasma stretches, until it meets the control threshold. Within 5 microseconds, a current boost command is sent out from the control unit 3 to the ignition energy management unit 2 and takes 3 μs to boost the discharge current. With the increase of the discharge current, the impedance of the plasma drops significantly, indicated by the decrease in discharge voltage.

Figure 13:
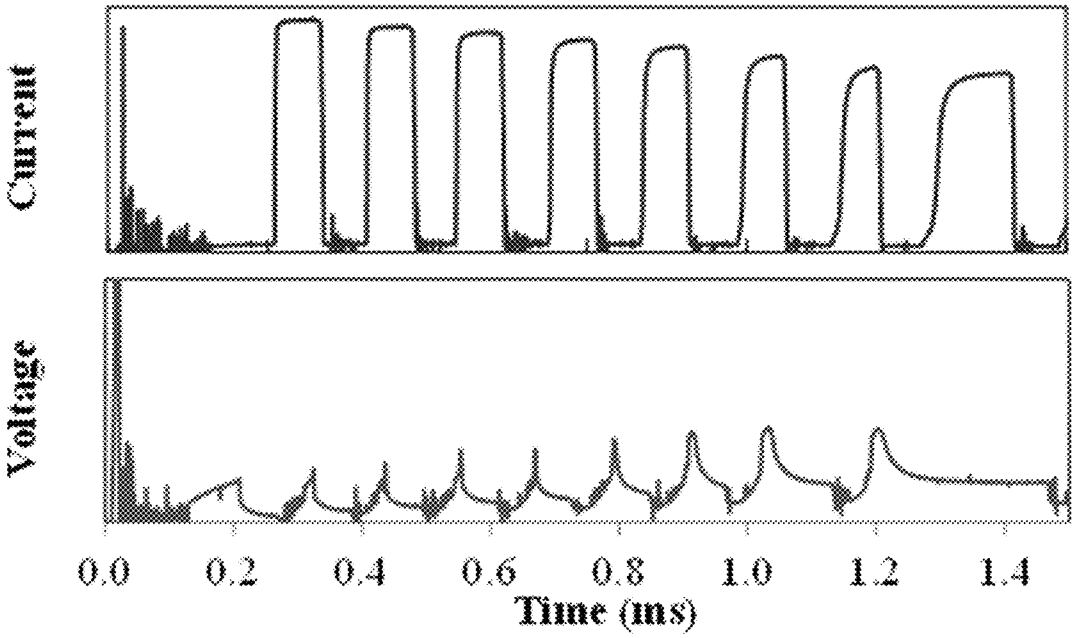
FIG. 13 is a graph depicting discharge waveform of a spark event with ignition current control.

Under real application, such current boost strategy can be used on a pulsed based manner, instead of a constant supply until the end of discharge, in order to decrease electrode erosion, as demonstrated in FIG. 13. For the demonstration case, 5 restrike events happen without plasma impedance modulation during the 1.5 ms discharge duration, while the restrike event can be eliminated with active discharge current boost strategy.

Figure 14:
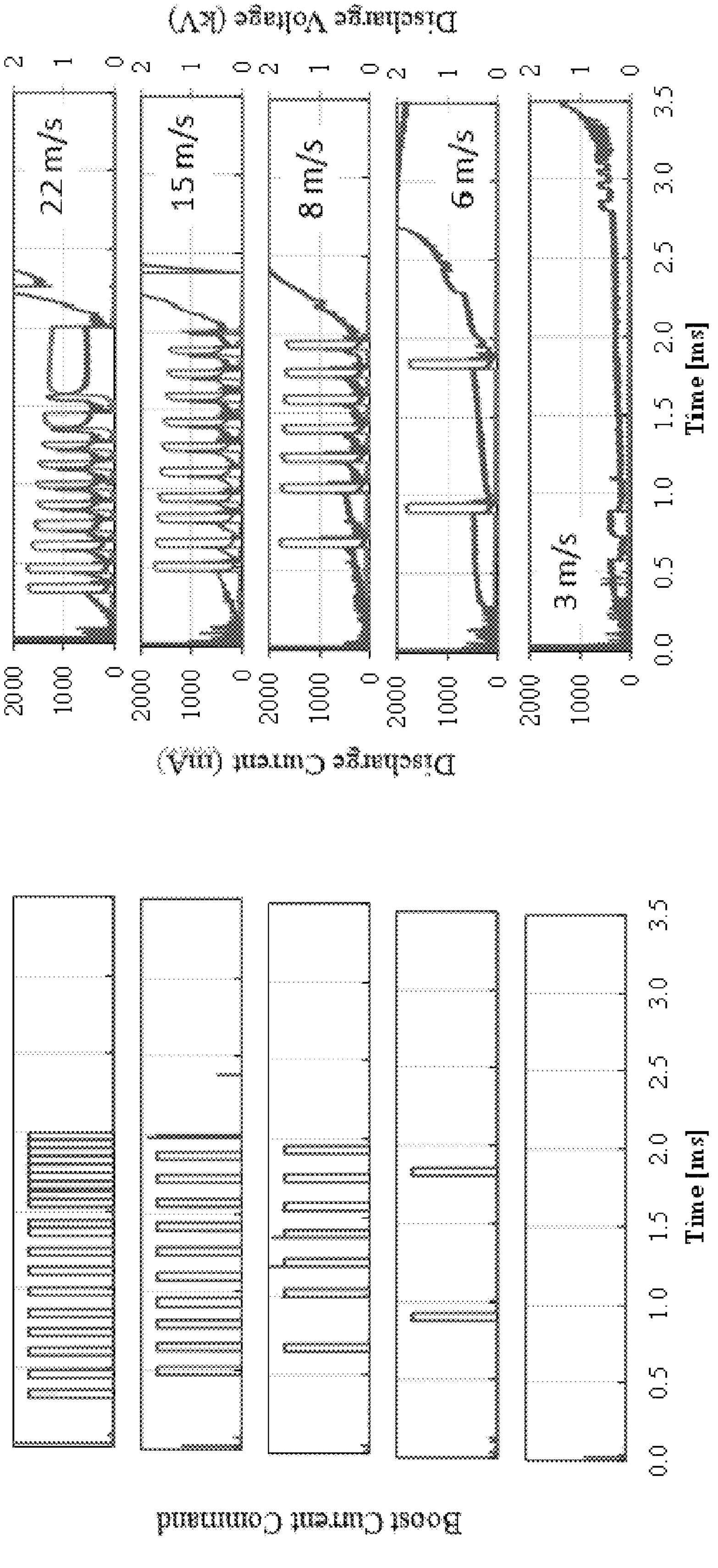
FIG. 14 is a graph depicting the capability using the method to avoid restrike event during the discharge process.

FIG. 14 depicted the on-demand supply of spark current from the ignition energy management unit 2 using the same strategy under various cross flow speed ranging from 3~22 m/s. When flow speed is low, the plasma stretches less, and the discharge voltage has minor increase during the discharge voltage. Under this scenario, the current boost strategy will not be triggered. When flow speed is high, the frequency of the current boost events increases accordingly, to save the plasma channel from restrike or blow-out.

Figure 15:
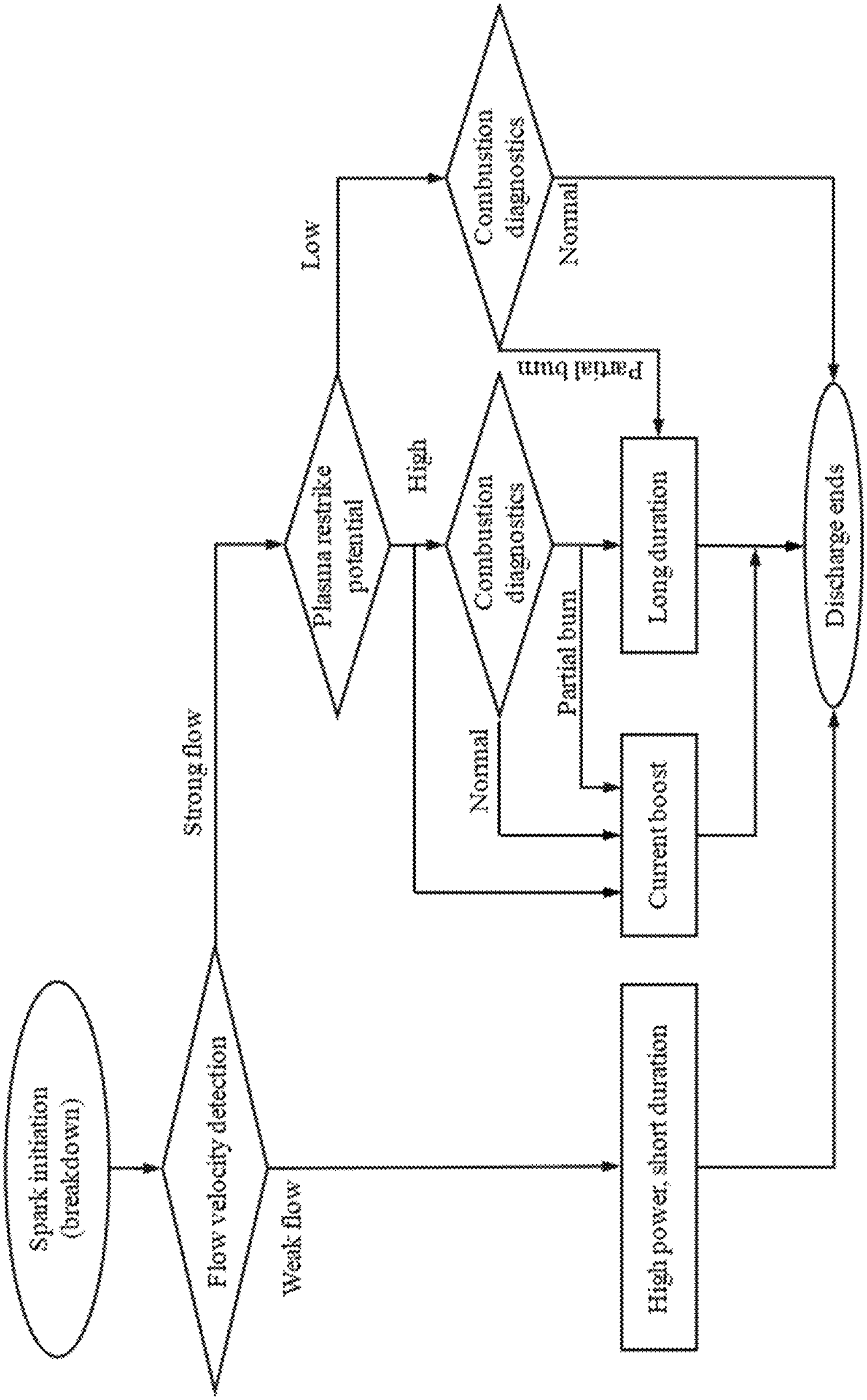
FIG. 15 is a graph depicting the control method of the ignition system.

The pulsed discharge of boost current can also be used to determine the status of the flame kernel, achieving on-demand discharge duration modulation, as shown in FIG. 15. Within S3 stage, the in-cylinder flow speed is determined first by the plasma diagnostic signal measured by dedicated ignition coil 1. The speed of the in-cylinder flow is determined based on the changing rate of plasma impedance; if in-cylinder flow speed is low, use a first control strategy, if in-cylinder flow speed is high, use a second control strategy.

A further embodiment relates to a first control strategy, wherein the discharge event is controlled to have a first discharge power and have a first discharge duration; within the first control strategy, where the in-cylinder flow speed is determined low, use a high discharge power with short discharge duration. Such control strategy can automatically detect the operation condition, such as when used for high-speed automotive engine and low-speed marine engine. When flow speed is low, the precise control of discharge current is unnecessary because the plasma channel stretching is mild, and the flame propagation speed is low. Under this condition, a longer discharge duration contributes less to a faster flame propagation process, therefore, a high power (50~200 kW), short discharge duration (50 μs~1 ms) strategy has higher benefit.

Within the second control strategy, wherein the restrike and blow-off tendency is predicted, and the discharge current amplitude is promptly increased if the restrike/blow-off tendency is high. Furthermore, the second control strategy is structured to predict the restrike/blow-off tendency via the changing rate and amplitude of the discharge voltage. The in-cylinder flow speed can also be estimated based on the changing rate of the discharge voltage. Furthermore, the second control strategy is structured to control both the discharge current amplitude and discharge duration based on combustion diagnostic and plasma diagnostic. If restrike/blow-off tendency is high but combustion is normal, then only increase the discharge current amplitude. If restrike/blow-off tendency is high and partial burn is detected, then increase the discharge current amplitude and prolong the discharge duration. If restrike/blow-off tendency is low but partial burn is detected, then only prolong the discharge duration.

Figure 16:
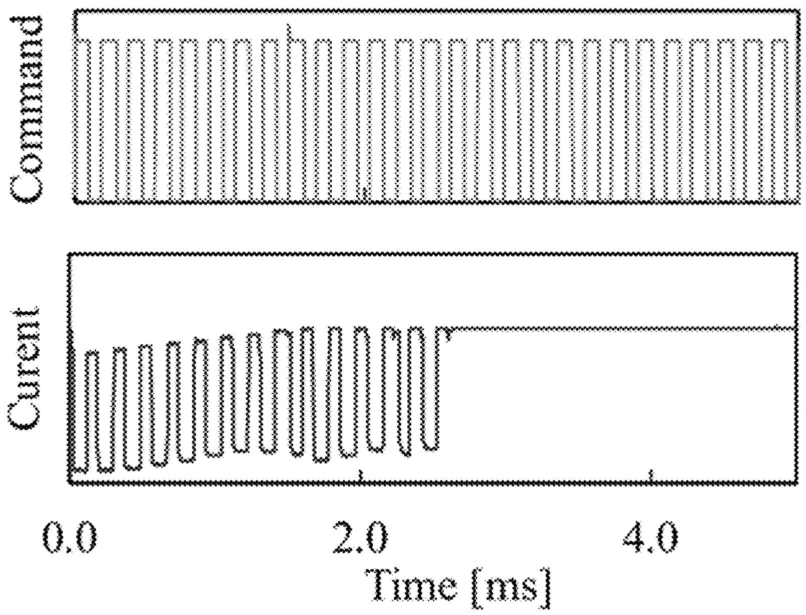
FIG. 16 is a graph depicting the current waveform of no combustion condition using voltage pulse flame detection method.
Figure 17:
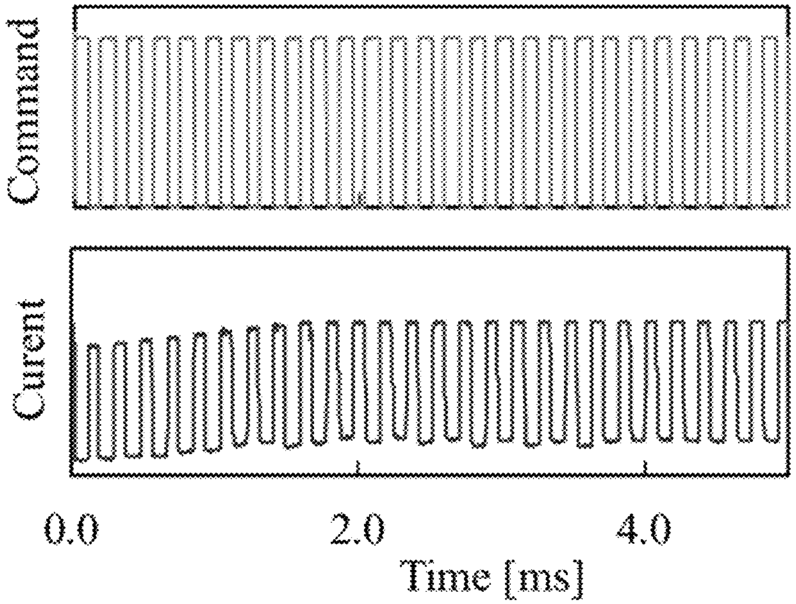
FIG. 17 is a graph depicting the current waveform of combustion condition using voltage pulse flame detection method.

An exemplary embodiment is demonstrated to perform combustion diagnostics. After ignition stage S3, a high frequency command train with certain duty cycle is generated by the control unit 3, and is synchronized with the start of the discharge event of the dedicated ignition coil 1. The preferable frequency and duty cycle of the control command, as well as the discharge current amplitude is mainly affected by the ion density of the gas media at the vicinity of the spark gap. Mixture with higher ion density, which represents a strong flame front, demands less discharge voltage/current to release the pulsed current without the support of the dedicated ignition coil 1. The parameters should be tuned such, that the ignition energy management unit 2 is not able to release the high frequency current when flame kernel is weak. FIG. 16 shows the discharge performance under ambient air, and it is obvious that the successful release of the pulsed current is only possible when the dedicated ignition coil 1 is still discharging. The pulsed boost current failed to release as soon as the discharge process is finished. However, at the presence of a healthy flame kernel as shown in FIG. 17, the discharge event can successfully discharge for 3 ms after the dedicated ignition coil 1 is fully discharged. The disclosed method provides a fast response time and can continue contribute to a strong ignition process until a successful ignition process is achieved.

Figure 18:
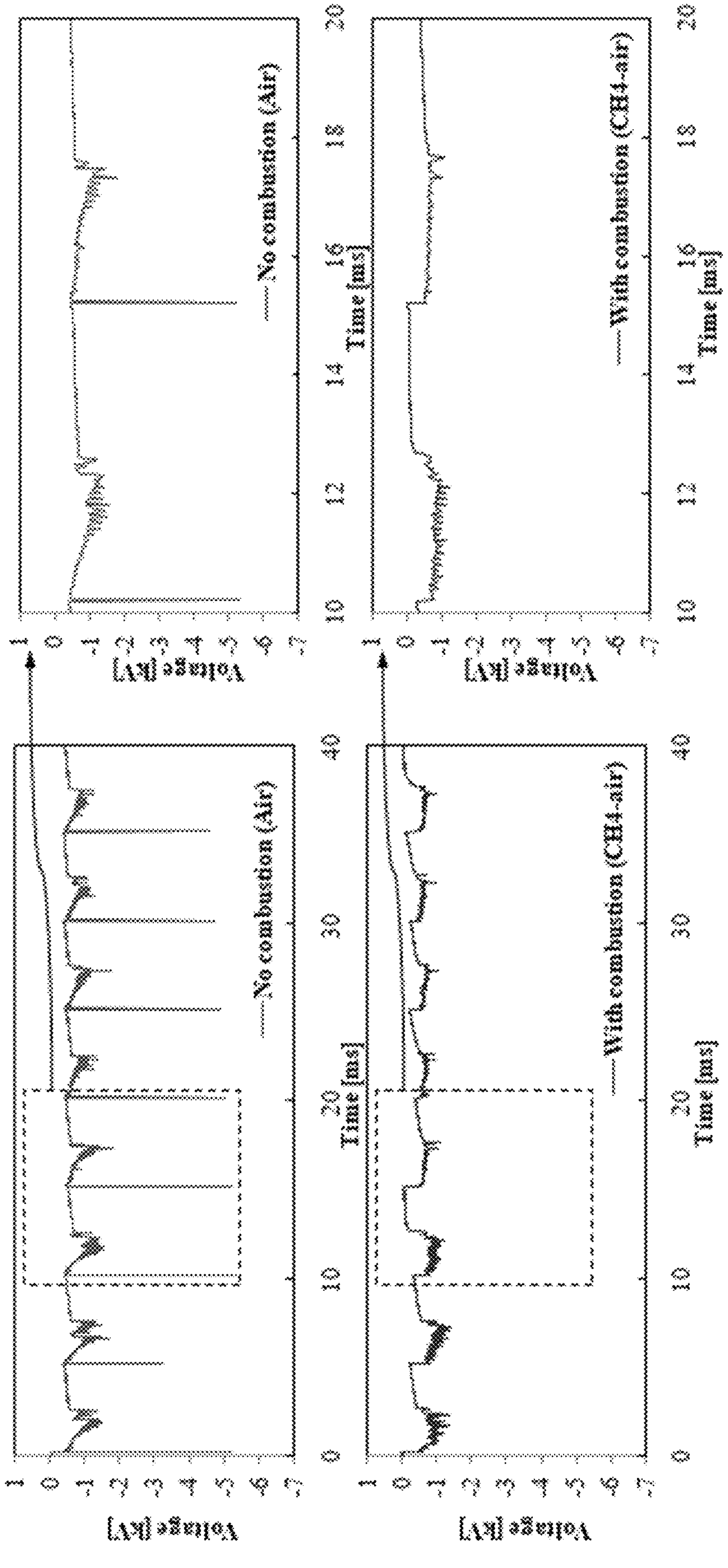
FIG. 18 is a graph depicting the discharge voltage waveform to detect flame propagation.

FIG. 18 shows another possible active flame kernel diagnostic strategy based on plasma impedance measurement to actively determine the proper discharge duration. The impedance of the plasma channel directly affects the discharge voltage, and the ionization intensity can affect the plasma impedance. FIG. 18 shows two discharge voltage curves, which can be captured via dedicated ignition coil 1. The blue discharge voltage is using air as ambient gas under certain flow speed, and the orange curve is under combustible gas. Both cases have identical cross-flow speed. Overall, the voltage in both cases increases with time, because of the stretching of the plasma channel, but the plasma in combustible gases has a lower slope, because of the lower impedance. The information can be subtracted and calculated promptly via control unit 3 and make fast decision during the discharge process, which is a major advantage compared with the ion current technique when sharing the same spark plug as both ignitor and ion sensor.

What is claimed is:

1. A method to control an ignition system, comprising following steps:

S1, spark initiation, utilizing a dedicated ignition coil to build up high voltage to establish a plasma channel;

S2, continuous discharge process, supplying a constant discharge current after establishment of the plasma channel; and S3, plasma diagnostic during a continuous discharge process, dynamically adjusting a discharge current amplitude based on a feedback signal from a plasma impedance to avoid blow-off and restrike of the plasma channel due to an in-cylinder flow, wherein the ignition system comprises:

at least one ignition module, wherein the at least one ignition module comprises:

an input end, configured to receive a command from an electronic control unit; and an output end, electrically coupled to a spark plug, wherein the output end is configured to deliver spark energy to a spark gap, wherein the at least one ignition module is configured to supply the spark energy adaptively based on engine operation conditions.

2. The method of claim 1, wherein the at least one ignition module comprises a control unit, at least one ignition energy management unit and the dedicated ignition coil, and an output end of the at least one ignition energy management unit is connected in parallel with an output end of the dedicated ignition coil, then connected to the spark plug;

the control unit is configured to receive a feedback signal including a plasma impedance signal and a combustion diagnostic signal to adaptively deliver an on-demand ignition energy according to an engine need via the at least one ignition energy management unit.

3. The method of claim 1, wherein the at least one ignition module comprises one ignition energy management unit and multiple dedicated ignition coils, and the number of the dedicated ignition coils equals the number of spark plugs; the output end of each dedicated ignition coil is electrically coupled to each spark plug separately, while an output end of the ignition energy management unit is split and then electrically coupled to all the spark plugs.

4. The method of claim 2, wherein the dedicated ignition coil comprises a primary coil and a secondary coil; the primary coil is coupled to an electronic switch to receive an ignition command to charge the dedicated ignition coil, and the secondary coil has an output end coupled to the spark plug.

5. The method of claim 4, wherein the output end of the at least one ignition energy management unit and the dedicated ignition coil are electrically coupled to a single directional circuit before coupled to the spark plug.

6. The method of claim 4, wherein the dedicated ignition coil is configured to measure a plasma voltage and send a voltage signal to the control unit.

7. The method of claim 4, wherein the at least one ignition energy management unit comprises multiple ignition coils connected in parallel; an output end of each ignition coil is electrically coupled to a high voltage diode, and then coupled with each other in parallel to form the output end, which is then split to coupled with spark plugs.

8. The method of claim 7, wherein if the number of the ignition coil is n, a discharge duty cycle of each ignition coil is equal to and within a range between 1/n to (n−1)/n, where n is equal to or greater than 3.

9. The method of claim 7, wherein a turning ratio of the ignition coil is within a range of 25:1 to 60:1.

10. The method of claim 4, wherein the at least one ignition energy management unit comprises a DC-DC converter, an energy storage capacitor, and a high voltage electronic switch, an input side of DC-DC converter is connected to a power source, while an output side of the DC-DC converter is connected to the energy storage capacitor;

one end of the high voltage switch is electrically coupled with an output end of the energy storage capacitor, the other end of the high voltage switch merged with the output end of the dedicated ignition coil, then coupled to the spark plug.

11. The method of claim 1, wherein in step S3, a discharge voltage is collected to calculate the plasma impedance as the feedback signal for enhancing the discharge current amplitude when the discharge voltage is above a certain threshold.

12. The method of claim 11, wherein in step S3, a speed of the in-cylinder flow is determined based on a changing rate of the plasma impedance; if the speed of the in-cylinder flow is low, using a first control strategy, if the speed of the in-cylinder flow is high, using a second control strategy.

13. The method of claim 12, wherein when the first control strategy is used, a discharge event is controlled to have a first discharge power and a first discharge duration.

14. The method of claim 12, wherein when the second control strategy is used, a restrike/blow-off tendency is predicted, and the discharge current amplitude is promptly increased if the restrike/blow-off tendency is high.

15. The method of claim 14, wherein the second control strategy predicts the restrike/blow-off tendency via a changing rate of the discharge voltage and an amplitude of the discharge voltage.

16. The method of claim 14, wherein the second control strategy estimates the speed of the in-cylinder flow based on the changing rate of the discharge voltage.

17. The method of claim 14, wherein the second control strategy controls both a discharge current amplitude and a discharge duration based on combustion diagnostic and plasma diagnostic, wherein if the restrike/blow-off tendency is high but a combustion state is normal, then only increasing the discharge current amplitude;

if the restrike/blow-off tendency is high and partial burn is detected, then increasing the discharge current amplitude and prolonging the discharge duration;

if the restrike/blow-off tendency is low but the partial burn is detected, then only prolonging the discharge duration.

18. The method of claim 17, wherein the combustion diagnostic provides voltage pulses via an ignition energy management unit after a spark event to initiate the plasma channel using a voltage lower than a breakdown voltage threshold, wherein if the discharge voltage/current is detected, the combustion state is considered normal;

if the discharge voltage/current is not detected, the combustion state is considered as the partial burn.

19. The method of claim 17, wherein the combustion diagnostic determines a combustion state based on the plasma impedance after the spark event.

20. The method of claim 17, wherein the combustion diagnostic determines a combustion state based on a changing slope of the plasma impedance under a specific discharge current amplitude, wherein if the changing slope is lower than a reference slope under an air condition, the combustion state is considered normal;

if the changing slope is the same or higher than the reference slope under the air condition, the combustion state is considered as the partial burn or misfire.

* * * * *